United States Patent
Miles et al.

(10) Patent No.: US 9,741,343 B1
(45) Date of Patent: Aug. 22, 2017

(54) VOICE INTERACTION APPLICATION SELECTION

(71) Applicant: Amazon Technologies, Inc., Reno, NV (US)

(72) Inventors: Andrew Christopher Miles, Lake Forest Park, WA (US); Frédéric Johan Georges Deramat, Bellevue, WA (US); Cory Curtis Manthei, Seattle, WA (US); Vikram Kumar Gundeti, Seattle, WA (US); Vikas Jain, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 655 days.

(21) Appl. No.: 14/134,941

(22) Filed: Dec. 19, 2013

(51) Int. Cl.
  G10L 15/00 (2013.01)
  G10L 15/01 (2013.01)
  G10L 15/22 (2006.01)
  G10L 15/26 (2006.01)

(52) U.S. Cl.
  CPC ............ G10L 15/265 (2013.01); G10L 15/00 (2013.01); G10L 15/01 (2013.01); G10L 15/22 (2013.01)

(58) Field of Classification Search
  None
  See application file for complete search history.

(56) References Cited

U.S. PATENT DOCUMENTS

| | | | | |
|---|---|---|---|---|
| 4,959,864 A | * | 9/1990 | Van Nes | G10L 15/22 704/251 |
| 5,317,732 A | * | 5/1994 | Gerlach, Jr. | G06F 8/34 |
| 5,369,730 A | * | 11/1994 | Yajima | G10L 13/06 704/267 |
| 6,311,159 B1 | * | 10/2001 | Van Tichelen | G10L 15/18 704/251 |
| 6,314,411 B1 | * | 11/2001 | Armstrong | G10L 15/18 704/E15.018 |
| 6,397,186 B1 | * | 5/2002 | Bush | G10L 15/26 704/272 |
| 6,615,172 B1 | * | 9/2003 | Bennett | G06F 17/2775 704/257 |
| 6,665,640 B1 | * | 12/2003 | Bennett | G06F 17/3043 704/257 |
| 7,171,352 B2 | * | 1/2007 | Chang | G06F 8/20 704/10 |
| 7,650,348 B2 | * | 1/2010 | Lowles | G06F 1/1626 707/999.101 |
| 7,689,410 B2 | * | 3/2010 | Chang | G06F 8/315 704/9 |
| 8,165,886 B1 | * | 4/2012 | Gagnon | G10L 15/26 704/275 |

(Continued)

Primary Examiner — Pierre-Louis Desir
Assistant Examiner — David Kovacek
(74) Attorney, Agent, or Firm — Pierce Atwood LLP

(57) ABSTRACT

An open framework for computing devices to dispatch voice-based interactions to supporting applications. Applications are selected on a trial-and-error basis to find an application able to handle the voice interaction. Dispatching to the applications may be performed without a determination of meaning conveyed in the interaction, with meaning determined by the individual applications. Once an application acts upon a voice interaction, that application may be given first-right-of-refusal for subsequent voice interactions.

20 Claims, 12 Drawing Sheets

(56) References Cited

U.S. PATENT DOCUMENTS

| | | | | |
|---|---|---|---|---|
| 8,595,642 B1* | 11/2013 | Lagassey | G06F 3/048 | 704/275 |
| 9,070,366 B1* | 6/2015 | Mathias | G06F 17/279 | |
| 2002/0055950 A1* | 5/2002 | Witteman | G06F 17/30017 | 715/203 |
| 2003/0144846 A1* | 7/2003 | Denenberg | G10L 21/00 | 704/277 |
| 2004/0030556 A1* | 2/2004 | Bennett | G06F 17/27 | 704/270 |
| 2004/0054539 A1* | 3/2004 | Simpson | G10L 15/30 | 704/270.1 |
| 2004/0215449 A1* | 10/2004 | Roy | G10L 15/1822 | 704/211 |
| 2005/0033582 A1* | 2/2005 | Gadd | G06Q 30/02 | 704/277 |
| 2005/0179540 A1* | 8/2005 | Rubenstein | B60R 16/0373 | 340/539.18 |
| 2005/0234710 A1* | 10/2005 | Falcon | G10L 15/22 | 704/200 |
| 2006/0069561 A1* | 3/2006 | Beattie | G10L 15/22 | 704/251 |
| 2007/0061149 A1* | 3/2007 | Chang | H04N 21/2543 | 704/275 |
| 2007/0109325 A1* | 5/2007 | Eveleigh | G06F 3/0236 | 345/684 |
| 2007/0265831 A1* | 11/2007 | Dinur | G06F 17/273 | 704/10 |
| 2008/0120102 A1* | 5/2008 | Rao | G10L 15/22 | 704/235 |
| 2008/0221902 A1* | 9/2008 | Cerra | G10L 15/065 | 704/270.1 |
| 2008/0262848 A1* | 10/2008 | Shienbrood | H04M 3/4936 | 704/275 |
| 2009/0327979 A1* | 12/2009 | Haverinen | G06F 3/14 | 715/864 |
| 2011/0016421 A1* | 1/2011 | Krupka | G06F 17/27 | 715/780 |
| 2011/0106531 A1* | 5/2011 | Liu | G06F 17/30743 | 704/214 |
| 2012/0131321 A1* | 5/2012 | Jitkoff | G06F 1/3203 | 713/2 |
| 2013/0121580 A1* | 5/2013 | Chen | G06Q 10/063 | 382/182 |
| 2013/0144610 A1* | 6/2013 | Gordon | H04W 4/00 | 704/201 |
| 2013/0159920 A1* | 6/2013 | Scott | G06F 17/3087 | 715/780 |
| 2013/0322665 A1* | 12/2013 | Bennett | G08G 1/096855 | 381/300 |
| 2013/0325453 A1* | 12/2013 | Levien | G10L 21/00 | 704/201 |
| 2013/0325481 A1* | 12/2013 | van Os | G10L 21/00 | 704/275 |
| 2014/0052452 A1* | 2/2014 | Koivuniemi | H04N 21/42203 | 704/275 |
| 2014/0052453 A1* | 2/2014 | Koivuniemi | H04N 21/4828 | 704/275 |
| 2014/0081633 A1* | 3/2014 | Badaskar | G06F 17/30023 | 704/235 |
| 2014/0180697 A1* | 6/2014 | Torok | G06F 17/3074 | 704/275 |
| 2014/0244259 A1* | 8/2014 | Rosario | G10L 15/08 | 704/254 |
| 2014/0365496 A1* | 12/2014 | Chung | G06F 9/4443 | 707/740 |
| 2015/0058711 A1* | 2/2015 | Zeng | G06F 17/2247 | 715/234 |
| 2015/0066510 A1* | 3/2015 | Bohrer | G10L 13/043 | 704/260 |
| 2015/0081296 A1* | 3/2015 | Lee | G10L 15/20 | 704/239 |

* cited by examiner

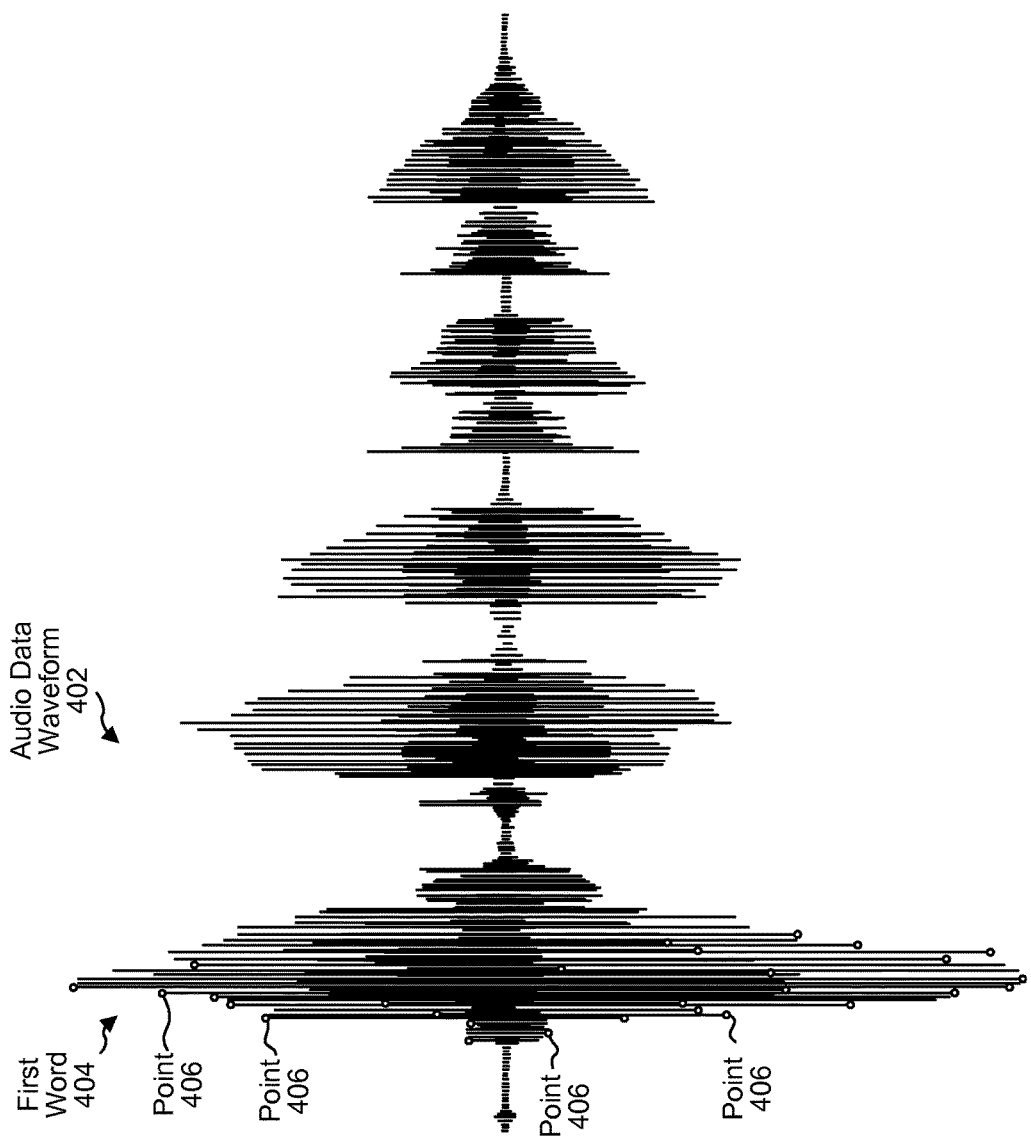

VOICE INTERACTION APPLICATION SELECTION

BACKGROUND

Computing devices routinely employ techniques to identify the words spoken by a human user based on the various qualities of a received audio input. Such techniques are called speech recognition or automatic speech recognition (ASR). Speech recognition combined with natural language processing (together referred to as speech processing) techniques may allow a user to control a computing device to perform tasks based on the user's spoken commands.

BRIEF DESCRIPTION OF DRAWINGS

For a more complete understanding of the present disclosure, reference is now made to the following description taken in conjunction with the accompanying drawings.

FIG. 4 illustrates an example of an audio waveform processed to be processed as speech.

DETAILED DESCRIPTION

A problem with using speech recognition to control electronic devices is determining which software application should handle a user's voice interaction if multiple applications exist. A "voice interaction," "voice command," or "user command" is any message requiring action or a response, control instruction, task, or query that is directed to the electronic device by a user's speech utterance. One solution is to have a primary automatic speech recognition (ASR) program interpret a user's speech and either handle tasks itself or select a specialized application to fulfill the user's request based on spoken keywords. Among other problems with this solution is the lack of flexibility: while the primary ASR program may be able to handle a variety of pre-programmed tasks, commands, and scenarios, it is still limited in its knowledge. For example, a third-party application may provide a range of speech-driven capabilities that the programmers of the primary ASR program never considered. The user could, of course, launch the third-party application directly prior to voice interaction, but requiring the user to micro-manage the process restricts the degree of integration that voice interaction can provide.

One possible solution would be to provide an Application Programming Interface (API) though which third-party applications could inform the primary ASR program of what keywords implicate the third-party program. However, as the number of third-party applications and keywords increase, the computational overhead necessary to select an application to respond to a user's voice interaction also increases. Another possible solution would be to present the user a list of applications that can respond to the user's request. However, this means that the user is again micromanaging, diminishing the utility of voice interaction.

Described herein is an approach to voice interaction processing where dispatch logic provides an open framework for automatically selecting an application to respond to voice interactions, decentralizing decision making by providing candidate applications an opportunity to themselves determine whether they are or not able to respond to a request.

Figure 1:
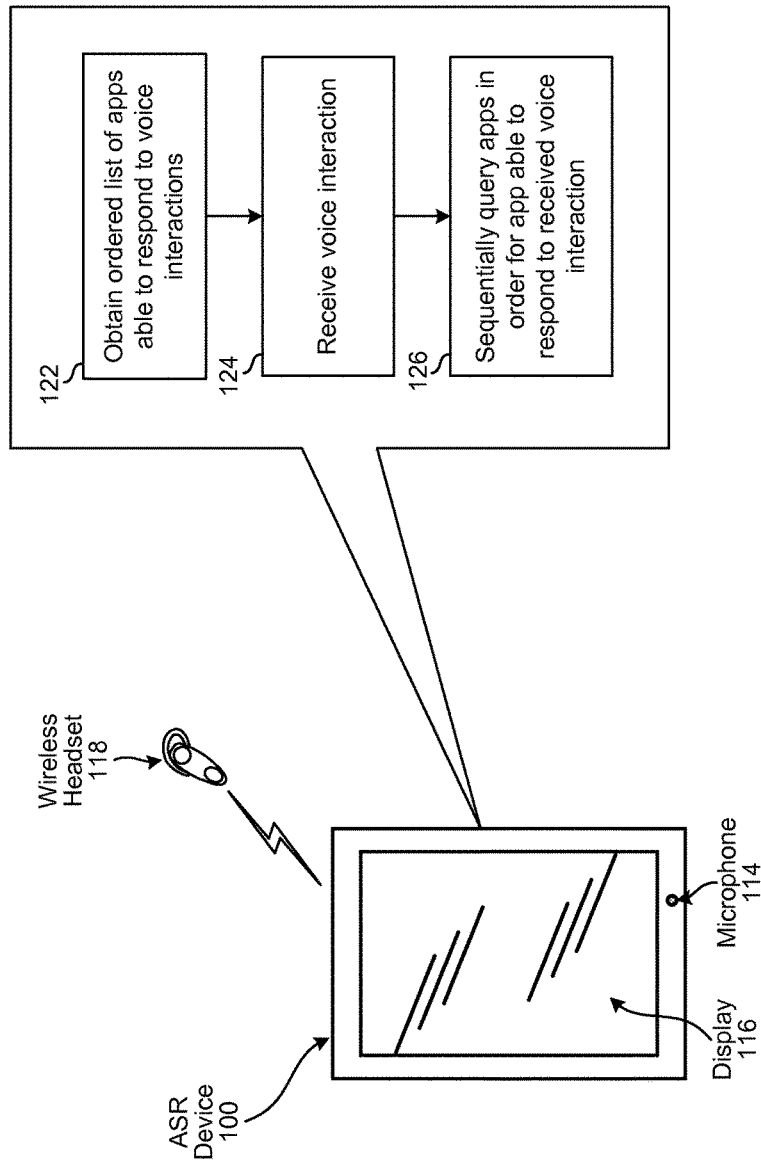
FIG. 1 illustrates a system for dispatching voice interactions to different software applications.

FIG. 1 illustrates a system for dispatching voice interactions to different software applications. The ASR-enabled device 100 obtains (122) a pre-sorted list of voice-interaction enabled applications and performs speech recognition. A voice interaction may be received (124) from an audio-input source such as a microphone 114 or a headset 118. A "command" or "attention" word may be used to indicate to the device that speech is intended as a voice interaction for processing, or some other indicia may be used to distinguish between speech for processing and speech to ignore (e.g., recognizing that a sentence is in the imperative tense, pressing a particular keyboard key or key combination, pressing a button, touching an icon on display 116, etc.).

Dispatch logic of the ASR-enabled device 100 uses the list of voice-interaction enabled application to sequentially query (126) the applications, with the dispatch logic providing the queried application with the voice interaction converted from speech into text form. The dispatch logic continues to query the applications until an application is found that is able to fulfill a user's request. The process of receiving voice interactions (124) and sequentially querying applications (126) may be repeated.

Figure 2:
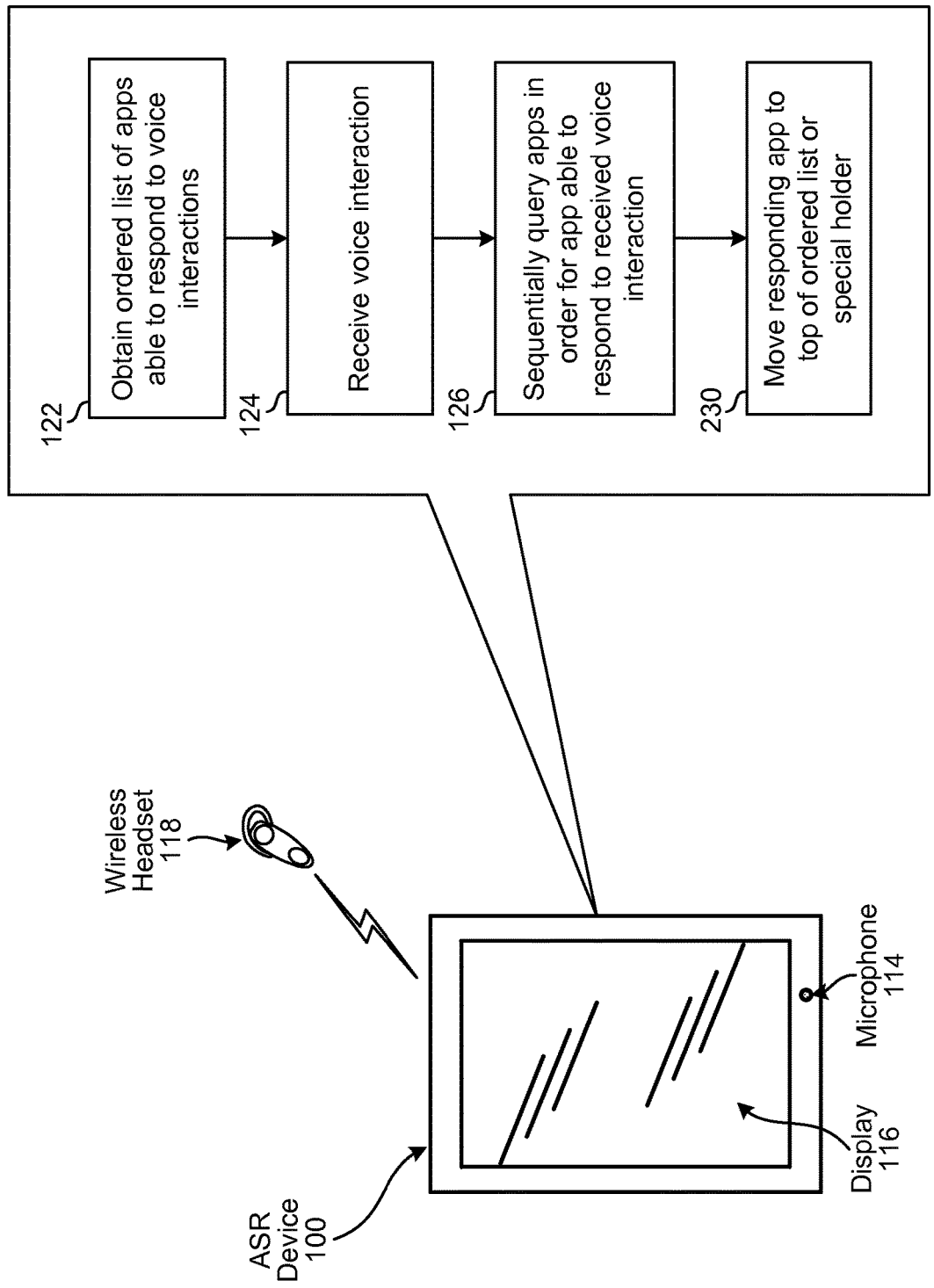
FIG. 2 illustrates another system for dispatching voice interactions to different software applications, supplementing the features of the system in FIG. 1.

FIG. 2 adds moving (230) a software application that responds to a received voice interaction to the top of the ordered list, or placing an identifier of the software application in a special "holder" (e.g., a location in memory or storage). In either case, the application's placement may be linked to a timer. The timer is restarted each time the application at the top of the ordered list or in the special holder responds to a voice interaction. If the timer expires or the application fails to respond to a voice interaction, the first application queried when a voice interaction is received may change. This feature facilitates a successful application repeatedly handling a series of voice interactions based on the presumption that their subject matter is related to a same active topical "focus.".

Figure 3:
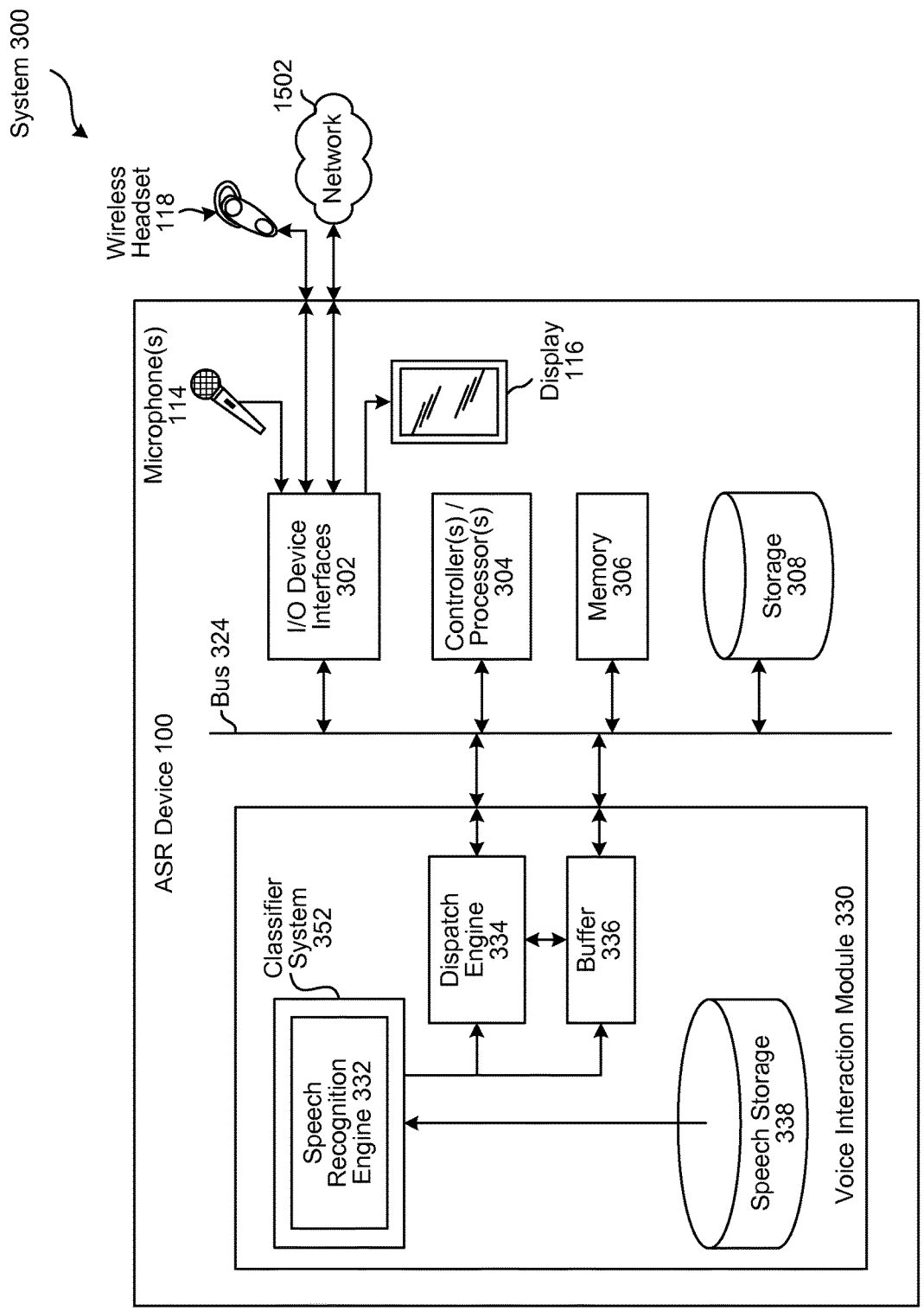
FIG. 3 is a block diagram conceptually illustrating a system and device for dispatching voice interactions to different software applications.

FIG. 3 illustrates a system 300 including the ASR device 100. The device 100 includes a voice interaction module 330, providing a speech recognition engine 332 that performs ASR and dispatch logic (dispatch engine 334) that manages the dispatch of voice interactions to different software applications on controller(s)/processor(s) 304. The software applications may be running on controller(s)/processors(s) 304 when the voice interaction is received, or the query from the dispatch logic 334 may cause the voice-interaction enabled application to be loaded.

The voice-interaction enabled applications executed by controller(s)/processor(s) 304 that receive and initially process the queries from the dispatch engine 334 may be support programs for larger applications or may be the applications themselves. A support program, for example, may be a background application or process configured to communicate with the dispatch engine 334 and one or more larger applications, acting as a voice-interaction gateway or bridge to those larger programs. The analysis of "meaning" behind the voice interaction may be handled by this bridge application or by the application(s) that the bridge serves.

If the support program does support more than one application, it may appear as a single application on the dispatch engine's sorted list, or may be listed multiple times as a front-end proxy for each individual application that the proxy serves. Among other things, this flexibility on how voice-interaction enabled applications self-identify to the dispatch engine 334 allows third-party software makers to either provide a unified front-end for software suites or to individually identify the components of the suite while still reusing the same front-end. This also allows software makers to add a voice-interaction front-end to legacy applications not originally designed for voice interaction, where the "bridge" application communicates with the dispatch engine's application programming interface (API) on one side, the legacy application's API on the other, and handles analysis of the meaning behind voice interactions therebetween.

As illustrated in FIG. 3, the ASR device 100 may include one or more audio capture devices for capturing spoken utterances such as microphone(s) 114. The audio capture device may be integrated into the ASR device 100 or may be separate from the ASR device 100, such as the microphone in a wireless headset 118, connected to the ASR device 100 by a connection such as Bluetooth.

The ASR device 100 may also include a video output device such as display 116 for displaying images. The display 116 may be a display of any suitable technology, such as a liquid crystal display, an organic light emitting diode display, electronic paper, an electrochromic display, a pico projector or other suitable components. The display 116 may be integrated into the ASR device 100 or may be separate from the ASR device 100. The display 116 may provide a touch-sensitive input surface (not shown), enabling direct interaction with features of a user interface.

The ASR device 100 may also include an address/data bus 324 for conveying data among components of the ASR device 100. Each component within the ASR device 100 may also be directly connected to other components in addition to (or instead of) being connected to other components across the bus 324.

The one or more controller(s)/processor(s) 304 may each include one or more central processing units (CPUs) for processing data and computer-readable instructions, and a memory 306 for storing data and instructions. The memory 306 may include volatile random access memory (RAM), non-volatile read only memory (ROM), non-volatile magnetoresistive (MRAM) and/or other types of memory. The device 100 may also include a data storage component 308, for storing data and instructions, including that of the voice-interaction enabled applications. The data storage component 308 may include one or more non-volatile storage types such as magnetic storage, optical storage, solid-state storage, etc. The device 100 may also be connected to removable or external non-volatile memory and/or storage (such as a removable memory card, memory key drive, networked storage, etc.) through the input/output device interfaces 302.

Computer instructions for operating the device 100 and its various components (e.g., an operating system and software applications) may be executed by the controller/processor 304, using the memory 306 as temporary "working" storage at runtime. The computer instructions may be stored in a non-transitory manner in non-volatile memory 306, storage 308, or an external device. Alternatively, some or all of the executable instructions may be embedded in hardware or firmware in addition to or instead of software.

The device 100 includes input/output device interfaces 302. A variety of components may be connected through the input/output device interfaces 302, such as the microphone 114, display 116, and touch interface. The input/output device interfaces 302 may also include an interface for an external peripheral device connection such as universal serial bus (USB), FireWire, Thunderbolt or other connection protocol. The input/output device interfaces 302 may also include a connection to one or more networks 1502 via an Ethernet port, a wireless local area network (WLAN) (such as WiFi) radio, and/or wireless network radio, such as a radio capable of communication with a wireless communication network such as a Long Term Evolution (LTE) network, WiMAX network, 3G network, etc. Through the network(s) 1502, the device 100 may connect to a distributed computing environment.

The speech recognition engine 332 of the voice interaction module 330 processes received audio data, converting it into an interpreted result such as text. The speech voice interaction module may part of a classifier system 352 configured to perform speech recognition. The classifier system 352 may be, for example, a Support Vector Machine (SVM), although other machine learning techniques might be used instead of or to augment SVM. The classifier system 352 may utilize Hidden Markov Models (HMMs), Gaussian Mixture Models (GMMs), Mel-Frequency Cepstrum Coefficients (MFCCs), etc.

Automatic speech recognition (ASR) includes speech recognition and natural language processing. Speech recognition comprises converting speech into an interpreted result such as text, whereas natural language processing (NLP) comprises determining the meaning of that interpreted result. Speech processing may include both ASR and NLP.

The speech recognition engine 332 of the classifier system 352 transcribes audio data into interpreted data such as text representing the words of the speech contained in the audio data. This text data may then be used by other components for various purposes in addition to voice interactions to be executed by enabled applications, such as for dictation. A spoken utterance in the audio data is input to the voice interaction module 330 which then interprets the utterance based on the similarity between the utterance and models "known" to the speech recognition engine 332. These models may be stored in speech storage 338.

The speech recognition engine 332 may, for example, compare the input audio data with models for sounds (e.g., speech units or phonemes) and sequences of sounds to identify words that match the sequence of sounds spoken in the utterance of the audio data. The speech recognition engine 332 may output the most likely words recognized in the audio data. The speech recognition engine 332 may also output multiple alternative recognized words in the form of a lattice or an N-best list.

At least a portion of natural language processing may be delegated to the applications that respond to queries from the dispatch engine 334. Specifically, determining the "meaning" behind voice interactions, with the exception of detecting "command" words or sounds used to identify that speech should be processed as a voice interaction with the device, may be left to the applications that are queried by dispatch engine 334. Intermediate natural language processing in-between transcribing the speech and determining domain (i.e., the general subject category of the speech) or "meaning," such as deconstructing grammar in voice interactions to determine sentence structure (e.g., identify subject, verb, object, etc.), may be handled either by voice interaction module 330, a separate program or operating-system level library component, or by the queried applications themselves.

Detecting "command" words, phrases, or sounds may be another function of the classifier system 352, comparing received audio data to "command" patterns stored in speech storage 338. In the alternative, detecting "command" words may be triggered by the occurrence of certain stored word or phrase patterns appearing in the transcribed text. These command words, phrases, or sounds may be generic to the device 100, such "attention computer." If grammar deconstruction is performed by the voice interaction module 330, detecting that a sentence is in the imperative tense may also be used as a trigger that speech is intended as a voice interaction, applying a rule-based process to determine tense based on grammar.

The voice interaction module 330 may be connected to the bus 324, input/output device interfaces 302, controller(s)/processor(s) 304 and/or other component of the ASR device 100. Audio data sent to the voice interaction module 330 may come from the audio capture devices (e.g., microphone 114, headset 118) or may be received by another of the input/output device interfaces 302, such as audio data captured by a remote entity and sent to the ASR device 100 over a network 15021502.

The dispatch engine 334 obtains a presorted list of voice-interaction enabled applications (122) from storage and sequentially queries the applications (126) for an application able to respond. The dispatch engine 334 may also resort the list. A determination that received speech is intended as a voice interaction may be made by the speech recognition engine 332 or classifier system 352 (e.g., signaling the dispatch engine 334 when a word, phrase, or sound matches a stored "trigger" pattern), may be made by the dispatch engine 324 (e.g., monitoring the transcribed text from the speech recognition engine 332 for a specific "trigger" word or phrase), or by another component of the voice interaction module 330, such as a module to deconstruct and tag the grammar of text output by the speech recognition engine 332.

A first-in-first-out buffer 336 may also be included to store the transcribed text of recently received speech. A voice-interaction enabled application queried by the dispatch engine 334 may request content preceding the voice interaction from the buffer 336, either directly or through the dispatch engine 334, if the application needs additional context to determine whether it can respond to the voice interaction.

The voice interaction module 330 further includes speech storage 338. The speech recognition engine 332 compares the speech component of received audio data with the acoustic, language, and other data models and information stored in the speech storage 338 for recognizing the speech contained in the original audio data. Speech storage 338 may be dedicated storage, may be part of storage 308, or may be a storage component external to the device 100.

The speech recognition engine 332 of classifier system 352 may include its own controller(s)/processor(s) and memory or it may use the controller(s)/processor(s) 304 and memory 306 of the ASR device 100. Similarly, the instructions for operating the speech recognition engine 332 and classifier system 352 may be located within the non-volatile memory 306 and/or storage 308 of the ASR device 100, or within an external device.

FIG. 4 is an illustration of a digitized audio data waveform 402, with multiple points 406 of the first word 404 as the first word 404 is being processed. The audio qualities of those points may be stored into feature vectors. Feature vectors may be streamed or combined into a matrix that represents a time period of the spoken utterance. These feature vector matrices may then be processed by the classifier system 352.

Processed speech component feature vectors may be output from the voice interaction module 330 and sent to the input/output device interfaces 302 for transmission to another device for further processing. The speech component feature vectors may be encoded and/or compressed prior to transmission.

The speech recognition engine 332 may process the speech component data with reference to information stored in the speech storage 338. Alternatively, processed speech data (such as feature vectors) may be received by the voice interaction module 330 from another source. For example, another entity may process audio data into feature vectors and transmit that information to the ASR device 100 through the input/output device interfaces 302. Feature vectors may arrive at the ASR device 100 encoded, in which case they may be decoded prior to processing by the speech recognition engine 332.

The speech storage 338 includes a variety of information for speech recognition such as data matching pronunciations of phonemes to particular words. The speech storage may also include a dictionary of words or a lexicon. The speech storage may also include data describing words that are likely to be used together in particular contexts.

Following automatic speech recognition processing, the speech recognition results may be provided to the dispatch engine 334 (among other components). The dispatch engine 334 may send the results as a voice interaction to one or more applications running (or to be instantiated by request) on controller(s)/processor(s) 304 for natural language processing and interpretation, or to the input/output device interfaces 302 for sending to a voice-interaction enabled application executed (or to be executed) on an external device.

The interpreted result (e.g., transcribed text) may be stored in the buffer 336 with a time stamp. In addition to or as an alternative to the interpreted result, the buffer may store semantic representations of the voice interaction. The dispatch engine 334 may provide the time stamp corresponding to the voice interaction to the queried application. As an alternative to sending the voice interaction to the queried applications, the dispatch engine 334 may send the time stamp, whereby the queried application accesses buffer 336 to determine the content of the voice interaction.

Figure 5:
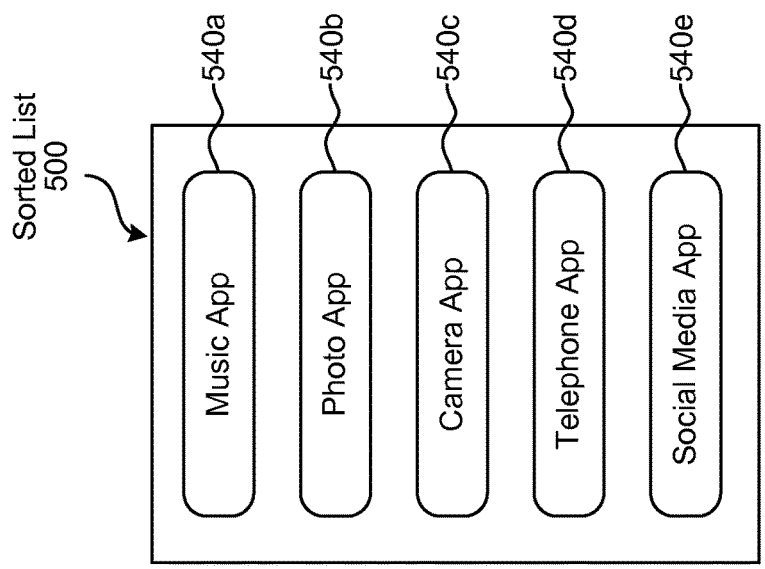
FIG. 5 illustrates a sorted list of software applications for processing voice interactions.

FIG. 5 illustrates an example of a sorted list 500 that may be obtained (122) by the dispatch engine 334. The ordered list includes five software applications that may process voice interactions: a music player application (540a), a photo management application (540b), a camera application (540c), an application to place and receive telephone calls (540d), and a social media application (540e). This list 500 may be presorted and held in storage based upon user preferences or defaults, may be prepared by software running on the controller(s)/processor(s) 304, may be compiled by the dispatch engine 334, may be based on patterns of past device usage (e.g., mostly frequently used applications being given higher priority than less frequently used application), etc. Any appropriate criteria may be used for presorting the list. For example, the list may also be based on default device settings, the most frequently used software applications, or the most recently used software application.

Figure 6:
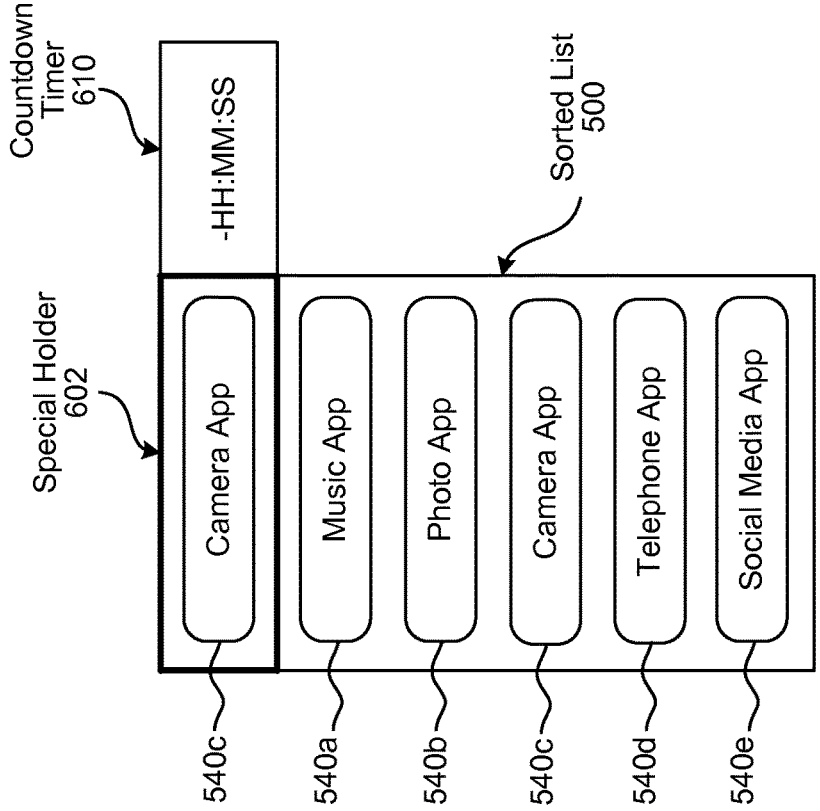
FIG. 6 illustrates the sorted list of software applications from FIG. 5 linked to a special holder for the application that handled the most recent voice interaction.

FIG. 6 illustrates the sorted list 500 from FIG. 5 used in conjunction with the special holder 602 discussed with FIG. 2. After a software application (camera app 540c in this example) responds to a voice interaction, it is placed in the special holder 602. It remains in the special holder until either a timer (e.g., countdown timer 610 of dispatch engine 334) expires or the application fails to respond to a voice interaction. If the application in the special holder 602 fails to respond to a voice interaction, the dispatch engine 334 may skip over that application if it encounters it again in the sorted list 500.

In the alternative, instead of a special holder, the dispatch engine 334 may move the application to the top of the list. If the timer expires, the dispatch engine 334 may restore the original list 500. If the application fails to respond to a voice interaction, the dispatch engine 334 may, for example, push the application down in the list, placing the responding application first, or restore the original list 500 and then place the responding application first.

Figure 7:
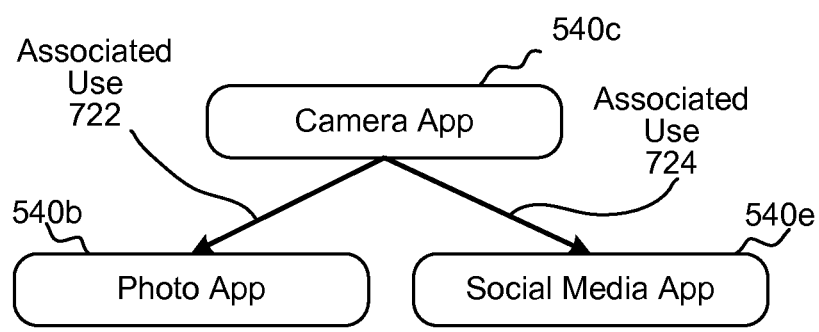
FIG. 7 illustrates identified associations between software applications.

Certain applications may be linked to others based on configured designations or based on device usage. For example, as illustrated in FIG. 7, after a camera application 540c is used, it may be likely (associated use 722) that the photo application 540b would be called upon next. It may also be likely (associated use 724) that the social media application 540e would be called upon next.

Figure 8:
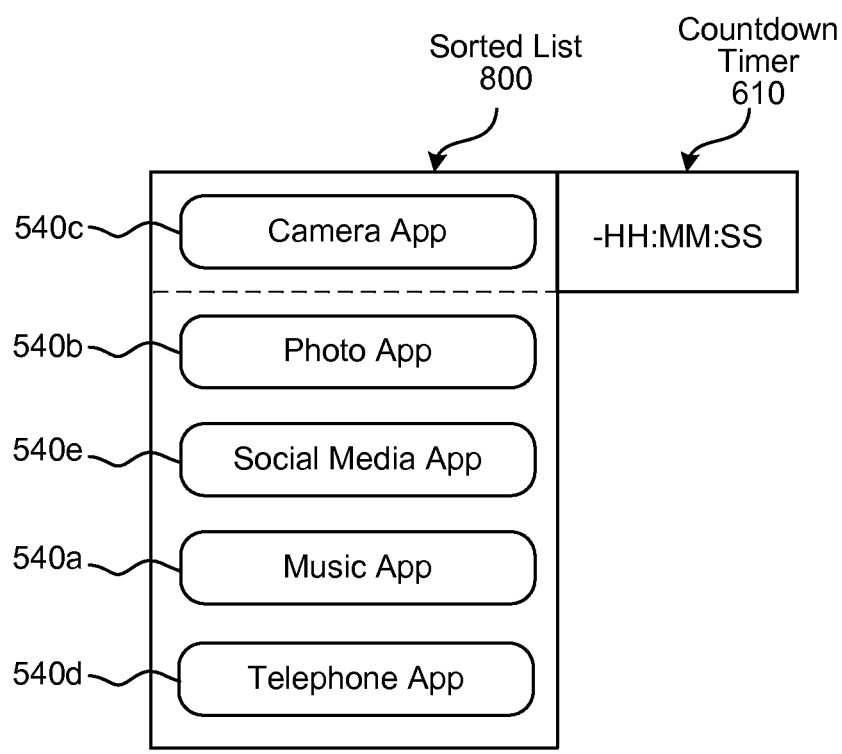
FIG. 8 illustrates sorting the software applications based in part upon their identified associations.

As illustrated in FIG. 8, when an application (e.g., the camera application 540c) responds to a voice interaction and is moved to the top of the list (or placed in the special holder), the applications that are likely to be called next, based on associations (722, 724) between the camera application and other applications, may be sorted to immediately follow the top application on the presumption that if the top application is unable to respond to a voice interaction, the associated applications are the next most likely to be used. The specific order of the associated applications may be based on the numerical/statistical likelihood that one application is more likely than another to handle the next voice interaction.

Figure 9:
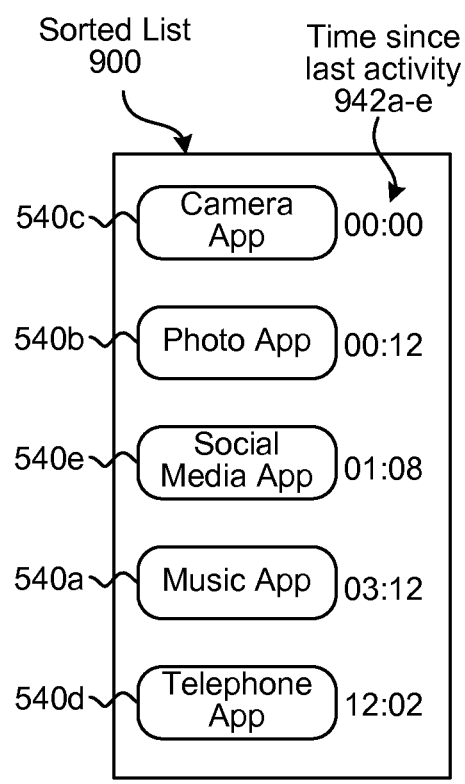
FIG. 9 illustrates sorting the software applications based on the amount of time since the applications' most recent activity.

FIG. 9 illustrates a sorted list 900 where the applications are sorted based on the amount of time since their last activity 942a-e. This time may be based on, among other things, the amount of time since any activity by the application, or the amount of time since the application last successfully responded to a voice interaction. If based on the amount of time since any activity by the application, the sorted list 900 may also be used in conjunction with the special holder, or the top application in the list may be independent of the time since the last activity 942a-e, similar in operation to the special holder.

Figure 11:
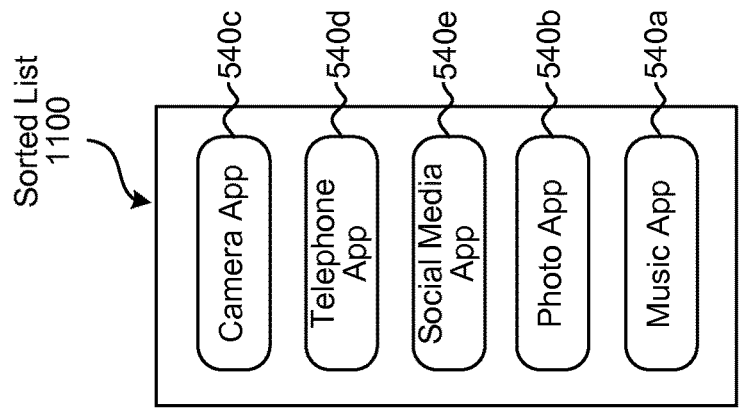
FIG. 11 illustrates sorting the software applications based on their associations with software applications and environment content and device capabilities.
Figure 10:
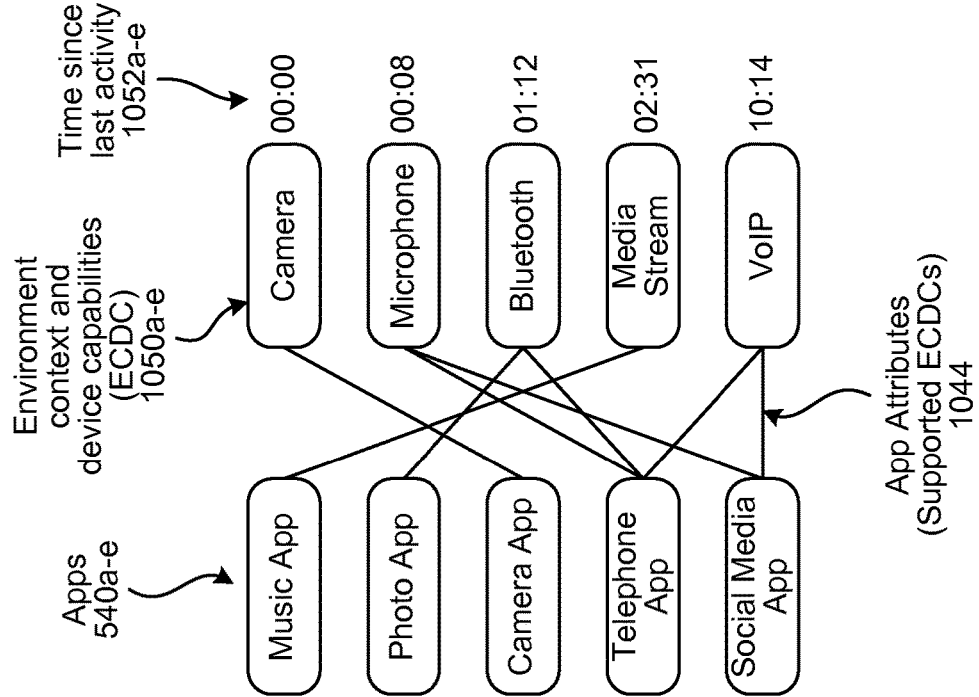
FIG. 10 illustrates associations between software applications and environment content and device capabilities, and the time since the environment content and device capabilities' most recent activity.

FIG. 10 illustrates examples of several "environment content and device capabilities" (ECDCs) 1050a-e on the device 100 and their associations 1044 to various software applications 540a-e. ECDCs include, among other things, the hardware features and open communication connections of the device 100 (e.g., camera, wireless network capability and connections, telephone, Voice over Internet Protocol (VoIP) connections, connected printers, etc.), what network "ports" are currently open, the format type (e.g., stored video, streamed video, formatted text, picture, etc.) of data being received, what type of document is at the forefront of a user interface on the display 116, what application is at the forefront of the user interface, what application was most recently opened (which may also be determined by network port), what application are available to the device (either locally or remotely), etc. The associations 1044 between the applications 540 and the ECDCs 1050 may be preset, may be determined based usage patterns, or may be determined based on defined attributes (e.g., compatible file types, etc., as identified by the software to the device's operating system) of each voice-interaction enabled software applications on the device. The time since the last activity 1052a-e of each ECDC may be monitored. As shown in FIG. 11, the list (1100) of applications may be sorted to prioritize applications based on which applications are associated with the recently active ECDCs.

A change in recently active ECDCs may correspond to a change in some configured state of the device that also represents a change in the active topical "focus." Such a change in focus may result in the software application currently located in the special holder 602 to lose its right-of-first-refusal. A change in focus may also result in a new sorting of the list of applications. For example, if a reminder pop-up appears on display 116 after it is generated by a calendar application running on the controller(s)/processor(s) 304, this may be regarded as a change in the configured state of the device, as there is a likelihood that the next voice interaction will relate to the pop-up rather than to whatever processes were previously ongoing. Thus an application may be place in focus that relates to the reminder pop-up. In the alternative, certain ECDC events may be tagged for special handling with a preferred application or applications stored in memory based on predetermined defaults, user preferences, or successfully processing such ECDC events in the past. For example, the first time a "disruptive" ECDC event occurs, it may be handled using the existing list. However, the application that successfully handles the disruptive change in state may be stored in a special handling holder, similar to the special holder 602, but associated with the specific disruptive change in device state. After a disruptive event is handled, application priority may revert back to whatever is in place before the event, may revert back to whatever was in place before the event but without an application being designated as having first-right-of-refusal, may be based on a newly resorted list, etc.

Figure 12:
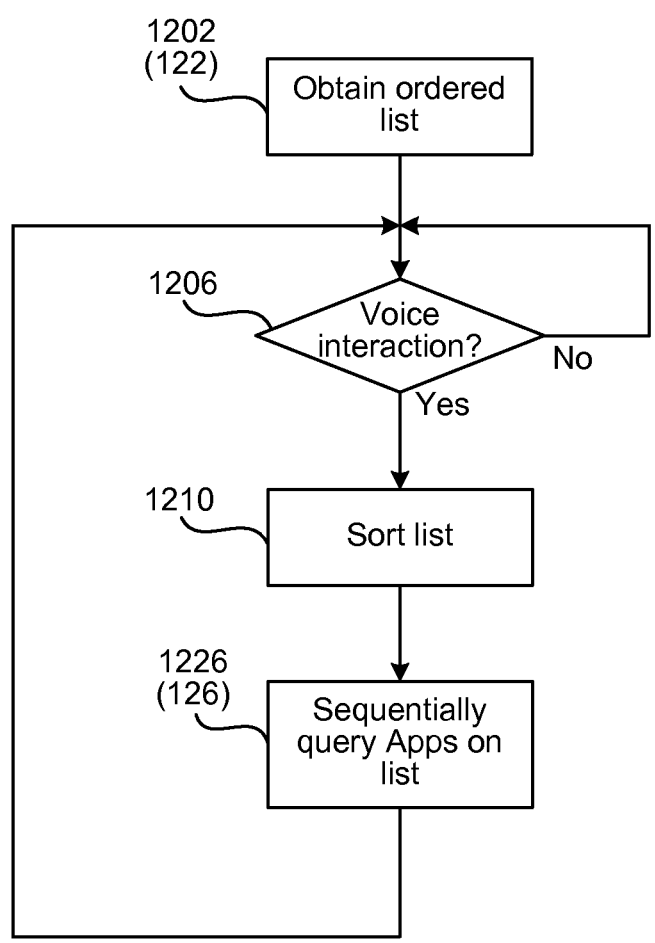
FIG. 12 illustrates an example algorithm based on the system in FIG. 1.

FIG. 12 illustrates an example of an algorithm that may be used by the dispatch engine 334 based on the system of FIG. 1 to query voice-interaction enabled applications. Initially, a sorted list (e.g., 500) is obtained (1202/122), In this example, the dispatch engine 334 sorts (1210) the list each time a voice interaction is received (1206 "Yes," corresponding to 124), using a sort algorithm such as those describe with FIGS. 9 and 11, although any sort criteria may be used. The applications on the list are sequentially queried (1226/126) until the voice interaction is handled.

Querying (1226/126) may be done by providing each queried application information of increasing semantic sophistication. The first queried application, for example, may initially be provided the captured audio of the voice interaction. If the first queried application does not handle the voice interaction based on the audio, it may then be provided with text generated by automatic speech recognition (ASR). If the first queried application does not handled the voice interaction based on the text, it may then be provided with the results of natural language processing performed on the voice interaction. If the first queried application does not handle the voice interaction based on the natural language understanding (NLU) results, the querying proceeds to the second application to be queried and again proceeds with the iterative process. Data may be provided a different order, such as providing the ASR text first, then the natural language processing results, and then the captured audio.

Querying (1226/126) may also be performed as a series of passes through the entire list (or portions thereof) with increasing semantic sophistication, providing different tier of data to the applications on each pass. On a first pass, the captured audio of the voice interaction may be provided to the sequentially to the applications (captured audio to first app, then captured audio to second app, etc.). On a second pass, the converted text processed by automatic speech recognition may be provided to the applications (ASR text to first app, then ASR text to second app, etc.). On the third iteration, natural language processing may be applied to the voice interaction, with the NLU results provided to the applications. This iterative process may be performed until an application handles the voice interaction. Other orders may be used, such as starting with ASR text, then providing natural language processing results, then providing the captured audio.

Figure 13:
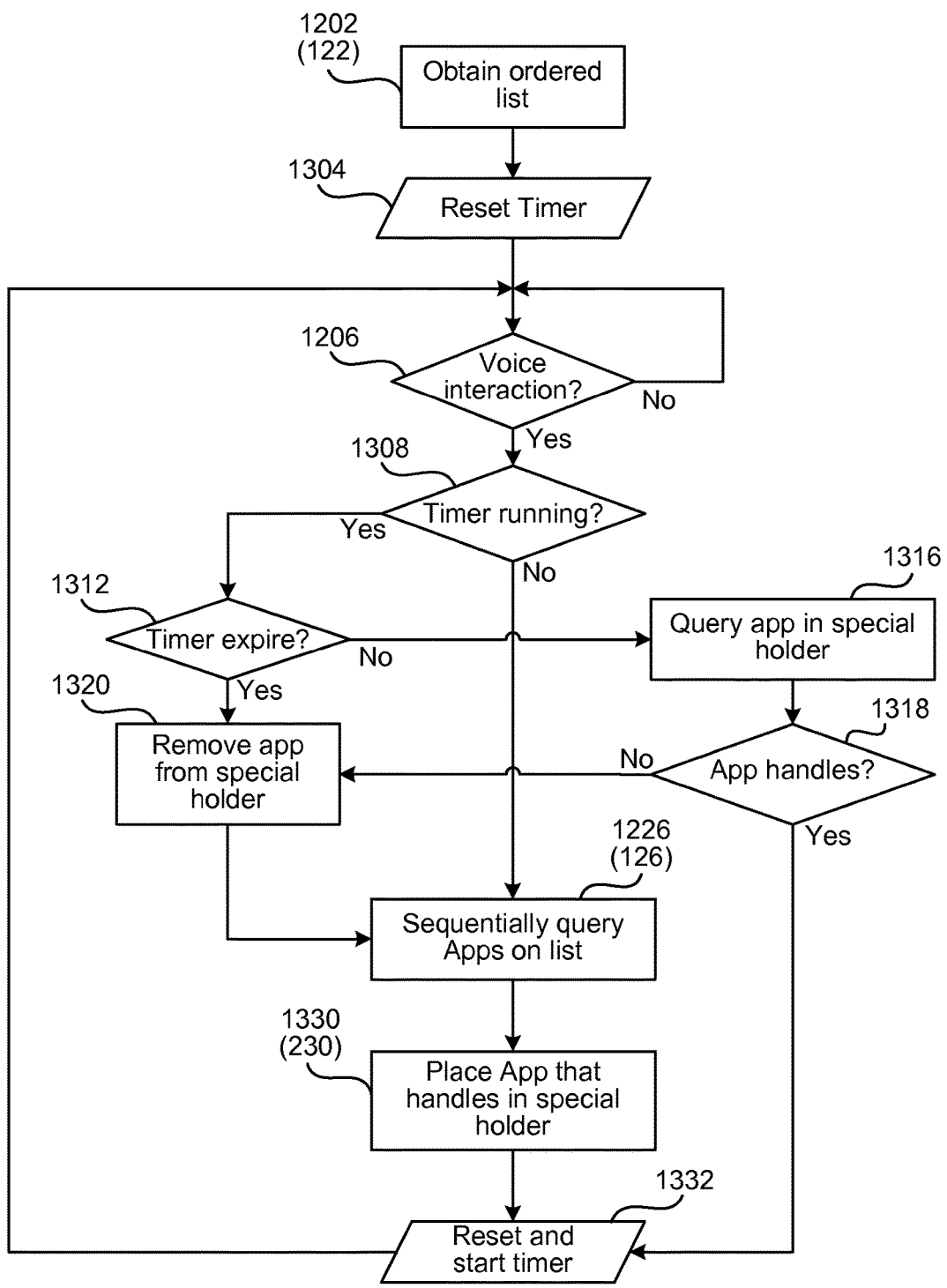
FIGS. 13 and 14 illustrate examples of algorithms based on the system in FIG. 2.

FIG. 13 illustrates an example of an algorithm that may be used by the dispatch engine 334 based on the system of FIG. 2 and the query order illustrated in FIG. 6. This example utilizes the special holder 602 and the associated timer (such as the countdown timer 610 of dispatch engine 334). The ordered list is obtained (1202/122) and the timer is reset (1304). If there is a voice interaction (1206 "Yes"), the dispatch engine 334 checks whether the timer is running (1308). As an alternative to whether the timer is running, the dispatch engine 334 may check to see if there is an application identified in the special holder.

If the timer is not running (1308 "No"), indicating that there is no application to be offered a first-right-of-refusal, the dispatch engine 334 sequentially queries the applications on the list of applications (e.g., list 500). When an application handles the voice request, the identify of that application is placed (1330/230) in the special holder 602. The timer 610 is reset and started (1332), and the process then loops back to waiting for the next voice interaction.

If, after receiving a voice interaction (1206 "Yes," corresponding to 124), the timer is running (1308 "Yes"), or in the alternative an application identifier is stored in the special holder), then the dispatch engine 334 checks to see if the timer has expired. If the timer has not expired (1312 "No"), the dispatch engine 334 queries (1316) the application identified in the special holder. If that application handles (1318 "Yes") the voice interaction, then the timer is reset and started (1332), and the process loops back to waiting for a next voice interaction.

If the application in the special holder is unable to handle the voice interaction (1318 "No"), then is loses its right-of-first-refusal and is removed (1320) from the special holder. The dispatch engine 334 then sequentially queries (1226/126) the applications on the list (e.g., 500) as before, but may skip the application that was previously listed in the special holder.

If the timer expires (1312 "Yes"), the application identified in the special holder 602 is removed (1320), on the presumption that it is unlikely that, after such a delay, the subject matter of the next voice interaction will be related to the last one.

While the query structure in FIG. 13 is based on the order illustrated in FIG. 6, sorting of the list may be added. For example, the list may be sorted after each voice interaction as described with FIG. 12, may be sorted each time a new application is placed in the special holder, or some combination thereof. Any of the disclosed sort methods may be used, including sorting applications based on associations with the application placed in the special holder as described in the discussion of FIG. 8.

Figure 14:
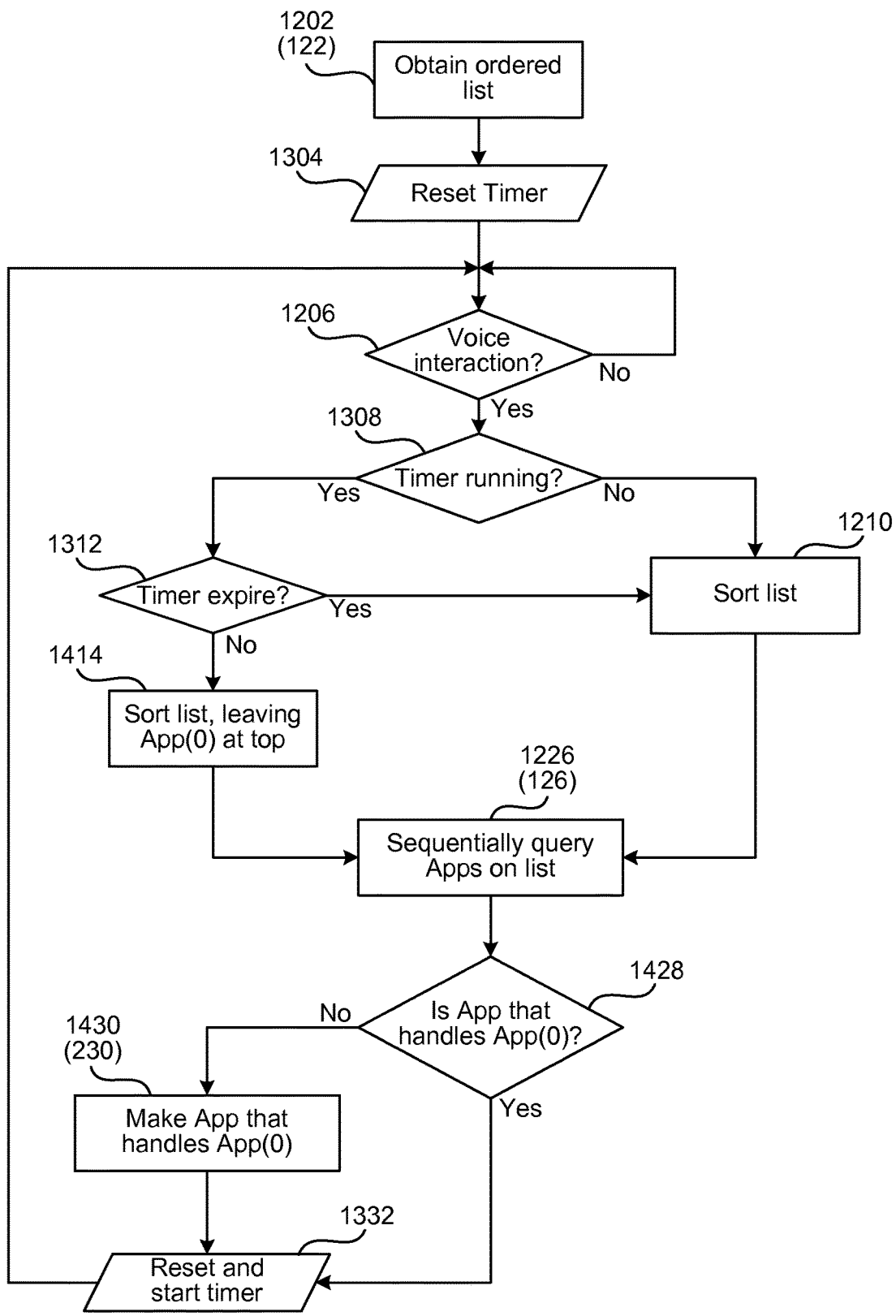

FIG. 14 illustrates another example of an algorithm that may be used by the dispatch engine 334 based on the system of FIG. 2. In this example, an application given right-of-first refusal is moved to the top of the list. After obtaining (1202/122) the ordered list (e.g., 500) and resetting (1304) the timer (e.g., 610), the dispatch engine 334 waits for a voice interaction (1206). When a voice interaction is received (1206 "Yes"), a check is made to see whether the timer is running (1308). Instead of a checking the timer, a flag or register bit might be used to indicate whether there is an application at the top of the list designated as having a right-of-first-refusal by virtue of having handled the last voice interaction.

If the timer is not running (1308 "No"), the list is sorted (1210). Any sort criteria may be used, or the dispatch engine 334 may instead restore the original order list (i.e., the originally obtained (1202/122) list 500). The dispatch engine then queries (1226/126) the applications on the list. If the application that handles the voice interaction is already at the top of the list (1428 "Yes"), then the timer is reset and started (1332) and the process loops back to waiting for a new voice interaction. If the application that handles the process is not at the top of the list (1428 "No"), then that application is moved to the top of the list (1430/230), the timer is reset and started (1332), and the process loops back to waiting for a new voice interaction.

If, after receiving a voice interaction (1206 "Yes"), the timer is running (1308 "Yes") but time has expired (1312 "Yes"), the list is again sorted (1210) or replaced with the originally obtained list 500. If time has not expired (1312 "No") then the list is sorted (1414), but the application at the top of the list (i.e., App(0)) is left in the first-to-be-queried position. But-for leaving the first application in place, any sort method may be used, including sorting the list based on associations of other applications with the first application as discussed with FIG. 8. The applications are then sequentially queried (1226/126) based on the order in the sorted list.

To reduce computational overhead, a time limit (not illustrated) may be set on how often sorts may be performed. Also, although the dispatch engine's timer is referred to as a countdown timer (e.g., timer 610), any timer may be used, including a count-up timer that is considered "expired" if a specific amount of time has transpired, or a differential timer based on comparing the current "time" with the time when the timer was "reset" and started (1332). Further, the arrangement of steps in the various figures may be performed in a different order to substantially the same effect, such as performing a sort prior to receiving the voice interaction.

Sorting the order in which applications are queried may be based upon the content of the voice interaction (i.e., the interpreted result, with or without application of natural language processing). The voice interaction module 330 may parse the voice interaction for keywords or phrases associated with particular software applications, sorting the list to give priority to applications implicated by the recognized word or phrases. Associations between keywords and phrases and particular applications may also be determined based on patterns of past usage. For example, if eighty-two percent of the time the word "picture" appears in the interpreted result, a camera application is selected, sixteen percent of the time a photo editing application is selected, and two percent of the time a social media application is selected, then when "picture" occurs in the in the interpreted result, the camera application may be given highest priority, the photo editing application second highest priority, etc.

Figure 15:
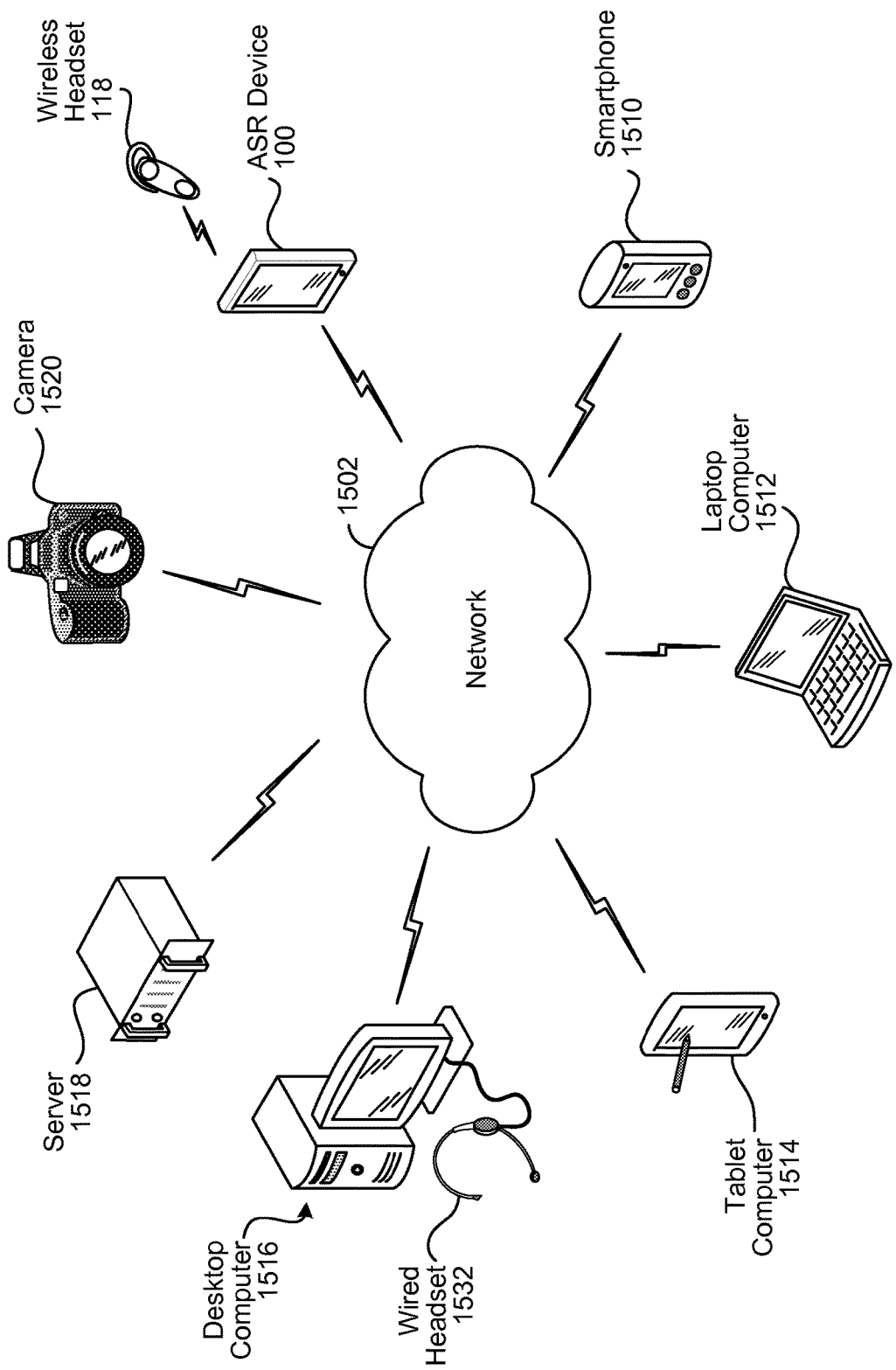
FIG. 15 illustrates an example of a computer network for use with the device for dispatching voice interactions to different software applications.

As illustrated in FIG. 15, multiple devices (100, 118, 1510 to 1520, and 1532) may contain components of the system 300 and the devices may be connected over a network 15021502. Network 1502 may include a local or private network or may include a wide network such as the internet. Devices may be connected to the network 1502 through either wired or wireless connections. For example, the device 100 may be connected to the network 1502 through a wireless service provider. Other devices, such as computers 1512 and server 1518, may connect to the network 1502 through a wired connection. Other devices, such as smartphone 1510, laptop 1512, tablet computer 1514, and camera 1520 may be capable of connection to the network 1502 using various connection methods including through a wireless provider, over a wireless local area network connection, or the like.

The voice interaction to be processed by the voice interaction module 330 may come from a remotely located device on a distributed network. For example, the voice interaction may be received on headset 1532 connected to the computer 1516 or a microphone connected to camera 1520 and sent over the network 1502 to voice interaction module 330. In such a distributed environment, the queried applications may be collocated with the source of the voice interaction (e.g., running on computer 1516), may be collocated with the voice interaction module 330, or may be running on a remote platform (e.g., "cloud" applications), such as applications running on server 1518. Likewise, some or all of the components of voice interaction module 330 may be collocated or distributed across the network 1502. For example, the classifier system 352, speech recognition engine 332, and speech storage 338 may remotely accessed by dispatch engine 334 over the network 1502. As another example, dispatch engine 334 may utilize network-distributed resources to sort the applications (e.g., 1210, 1414).

Aspects of the present disclosure include computer-readable and computer-executable instructions that may reside on the ASR device 100. FIG. 3 illustrates a number of components that may be included in the ASR device 100, however other non-illustrated components may also be included, and the included components may be remotely located across a network 1502 in the distributed environment. Also, some of the illustrated components may not be present in every device and system capable of employing aspects of the present disclosure. Further, some components that are illustrated in the ASR device 100 as a single component may also appear multiple times in a single device or system. For example, the ASR device 100 may include multiple input/output device interfaces 302 or multiple controller(s)/processor(s) 304. A user interface of device 100 and the processing components may be partially or entirely separate, with processing components of device 100 existing as part of a distributed system on remote devices in the "cloud" (i.e., devices separate from the device providing the user interface, connected to the device via network 1502 as illustrated in FIG. 15.

Multiple ASR devices may be employed in a single speech recognition system. In such a multi-device system, the ASR devices may include different components for performing different aspects of the speech recognition process. The multiple devices may include overlapping components. The ASR device 100 and system 300 as illustrated in FIGS. 1, 2, and 3 are exemplary, and may be a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, cameras, wearable computing devices (watches, glasses, etc.), other mobile devices, etc. The ASR device 100 may also be a component of other devices or systems that may provide speech recognition functionality such as automated teller machines (ATMs), kiosks, home appliances (such as refrigerators, ovens, etc.), vehicles (such as cars, busses, motorcycles, etc.), and/or exercise equipment, for example.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   obtaining a first list identifying a plurality of software applications configured to process voice interactions;
   receiving first audio data corresponding to a first voice interaction;
   performing speech recognition processing on the first audio data to obtain first text;
   sequentially querying the plurality of software applications in an order of the first list to determine whether a queried software application can process the first text, wherein the sequential querying continues until a first queried software application responds that it is able to process the first text;
   selecting the first queried software application;
   determining a first time corresponding to the first voice interaction;
   processing, using the first queried software application, the first text to generate one or more results;

causing output of audio corresponding to the one or more results;

receiving second audio data corresponding to a second voice interaction after causing the output of the audio;

determining a second time corresponding to the second voice interaction;

determining that a certain amount of time has not elapsed between the first time and the second time;

performing speech recognition processing on the second audio data to obtain second text; and querying the first queried software application to determine whether the first queried software application can process the second text, prior to querying any other software application of the plurality of software applications.

2. The computer-implemented method of claim 1, further comprising:

receiving third audio data corresponding to a third voice interaction, wherein the second audio data is received at the second time, the third audio data is received at a third time, and a time difference between the second time and the third time is greater than a specific amount of time;

performing speech recognition processing on the third audio data to obtain third text;

sequentially querying the plurality of software applications to determine whether a queried software application can process the third text, wherein the further sequential querying queries the plurality of software applications in the order of the first list and continues until a queried application responds that it is able to process the third text, and selecting a second application that responds that it is able to process the third text.

3. The computer-implemented method of claim 1, further comprising:

sorting the first list identifying the plurality of software applications to produce a second list in response to the first application processing the first text, wherein the second list is ordered based on a likelihood that each software application will be used after the first application, wherein after the first application is unable to process the second text, querying the plurality of software applications based on their order in the second list.

4. The computer-implemented method of claim 1, wherein the first list is sorted based on default device settings.

5. A computing device comprising:
a communication interface;
at least one processor; and
a memory including instructions operable to be executed by the at least one processor to perform a set of actions, configuring the computing device to:
receive first audio data corresponding to a first voice interaction;
sequentially query a plurality of software applications in an order of a first list of software applications until a queried application responds that it is able to process the first voice interaction;
select, from the plurality of software applications, a first application that responds that it is able to process the first voice interaction;
determine a first time corresponding to the first voice interaction;

receive second audio data corresponding to a second voice interaction after the first application processed the first voice interaction;
determine a second time corresponding to the second voice interaction;
determine that a certain amount of time has not elapsed between the first time and the second time; and
query the first application to determine whether the first application can process the second voice interaction, prior to querying any of the other plurality of software applications to determine if any of the other plurality of software applications can process the second voice interaction.

6. The computing device of claim 5, wherein the instructions further configure the computing device to:
receive third audio data corresponding to a third voice interaction after the first application has processed the first voice interaction and the second voice interaction;
determine a third time corresponding to the third voice interaction;
determine that the certain amount of time has elapsed between the first time and the third time; and
query a second application to determine whether the second application can process the third voice interaction, prior to querying any other software application of the plurality of software applications, wherein the second application has a higher priority than the first application within the first list.

7. The computing device of claim 5, wherein the instructions further configure the computing device to:
sort the first list to produce a second list in response to the first application processing the first voice interaction;
determine that the first application is unable to process the second voice interaction; and
query the plurality of software applications based on an order of the second list.

8. The computing device of claim 7, wherein the second list is ordered based on a likelihood that each software application will be used after the first application.

9. The computing device of claim 7, wherein the instructions further configure the computing device to:
perform speech recognition processing on the first audio data to obtain text corresponding to the first voice interaction,
wherein the first list is sorted to produce the second list based at least in part on the text.

10. The computing device of claim 7, wherein the instructions further configure the computing device to sort the first list based at least in part on how frequently each software application is used.

11. The computing device of claim 7, wherein the instructions further configure the computing device to:
select a second application that responds that it is able to process the second voice interaction; and
move the second application to the top of the second list to create a third list.

12. The computing device of claim 5, wherein the instructions further configure the computing device to:
perform processing on the first audio data to obtain at least one of speech recognition results or natural language understanding (NLU) results; and
wherein the query to the first application further comprises:
providing the first application at least one of the first audio data, the speech recognition results, or the NLU results.

13. A non-transitory computer-readable storage medium storing processor-executable instructions for controlling a computing device, comprising program code to configure the computing device to:
receive first audio data corresponding to a first voice interaction;
sequentially query a plurality of software applications in an order of a first list of software applications until a queried application responds that it is able to process the first voice interaction;
select, from the plurality of software applications, a first application that responds that it is able to process the first voice interaction;
determine a first time corresponding to the first voice interaction;
receive second audio data corresponding to a second voice interaction after the first application processed the first voice interaction;
determine a second time corresponding to the second voice interaction;
determine that a certain amount of time has not elapsed between the first time and the second time; and
query the first application to determine whether the first application can process the second voice interaction, prior to querying any of the other plurality of software applications to determine if any of the other plurality of software applications can process the second voice interaction.

14. The non-transitory computer-readable storage medium of claim 13, the program code further configuring the computing device to:
receive third audio data corresponding to a third voice interaction after the first application has processed the first voice interaction and the second voice interaction;
determine a third time corresponding to the third voice interaction;
determine that the certain amount of time has elapsed between the first time and the third time; and
query a second application to determine whether the second application can process the third voice interaction, prior to querying any other software application of the plurality of software applications, wherein the second application has a higher priority than the first application within the first list.

15. The non-transitory computer-readable storage medium of claim 13, the program code further configuring the computing device to:
sort the first list to produce a second list in response to the first application processing the first voice interaction;
determine that the first application is unable to process the second voice interaction; and
query the plurality of software applications based on an order of the second list.

16. The non-transitory computer-readable storage medium of claim 15, wherein the second list is ordered based on a likelihood that each software application will be used after the first application.

17. The non-transitory computer-readable storage medium of claim 15, the program code further configuring the computing device to:
perform speech recognition processing on the first audio data to obtain text corresponding to the first voice interaction,
wherein the first list is sorted to produce the second list based at least in part on the text.

18. The non-transitory computer-readable storage medium of claim 15, the program code further configuring the computing device to sort the first list based at least in part on how frequently each software application is used.

19. The non-transitory computer-readable storage medium of claim 15, the program code further configuring the computing device to:
select a second application that responds that it is able to process the second voice interaction; and
move the second application to the top of the second list to create a third list.

20. The non-transitory computer-readable storage medium of claim 13, the program code further configuring the computing device to:
perform processing on the first audio data to obtain at least one of speech recognition results or natural language understanding (NLU) results; and
wherein the query to the first application further comprises:
providing the first application at least one of the first audio data, the speech recognition results, or the NLU results.

* * * * *